UNITED STATES PATENT OFFICE.

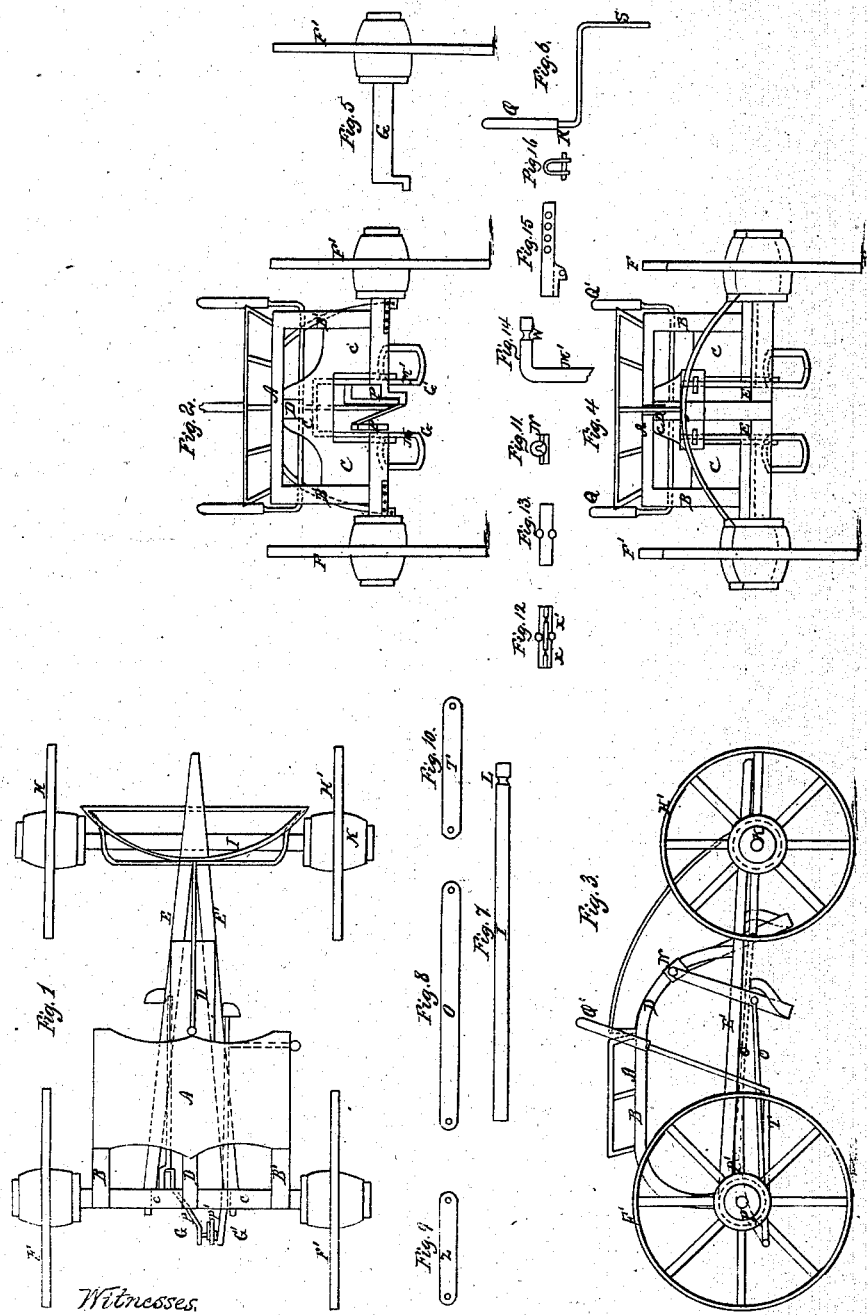

WILLIAM QUINN, OF PHILADELPHIA, PENNSYLVANIA.

IMPROVEMENT IN VELOCIPEDES.

Specification forming part of Letters Patent No. 47,220, dated April 11, 1865.

*To all whom it may concern:*

Be it known that I, WILLIAM QUINN, of the city of Philadelphia and State of Pennsylvania, have invented certain new and useful Improvements in the Construction of Velocipedes for the Use of Invalids and Lame Persons and Amusement and Exercise of Children; and I do hereby declare that the following is a full, clear, and exact description thereof, reference being had to the drawings annexed and making part of this specification, and the letters of reference marked thereon.

The nature of my invention consists in making a velocipede with levers operated by the hands, and also with treadles operated by the feet, and in so arranging and constructing the parts that they can be easily adjusted and altered at small expense to suit the individual who may require to use it without rendering the apparatus expensive in first cost, and at the same time affording an increased durability to the wearing parts by reason of improved construction of some of the minor details of the apparatus.

Figure 1 represents a plan of the velocipede. Fig. 2 represents a rear elevation of the velocipede. Fig. 3 exhibits a side elevation of the velocipede. Fig. 4 exhibits a front elevation of the velocipede. The remaining figures exhibit parts in detail. Fig. 5 exhibits a driving or hind wheel and axle. Fig. 6 exhibits a hand-lever. Fig. 7 exhibits the front axle. Fig. 8 exhibits one of the connecting links or rods for transmitting motion from the treadle to the crank. Fig. 9 exhibits a connecting-link for coupling the two cranked axles together. Fig. 10 exhibits one of the connecting links or rods for transmitting motion from the hand-levers to the crank. Fig. 11 exhibits the fulcrum-bearing of the treadles. Fig. 12 exhibits the box or bottom of the fulcrum-bearing, and Fig. 13 exhibits the top or cap of the same. Fig. 14 exhibits the upper portion of one of the treadles. Fig. 15 exhibits the back view of one of the crank-axle bearings, and Fig. 16 exhibits the side view of the same.

A is the seat; B and B', braces supporting the seat from the back axle-bearing, C.

D is a brace or perch supporting the seat A from the braces or perches E E'.

F and F' are the hind or driving wheels on the cranked axles G and G'.

H and H' are the front or guiding wheels, one of which, H, is fastened upon the axle I and rotates with it, and the other, H', is secured upon the axle I by means of a pin, K, fitting on the groove L, thus leaving H' free to rotate independently of the axle I.

M and M' are stirrup or treadle levers suspended by the fulcrum-bearing N, and operated by the feet of occupant of the vehicle. The pendulous motion of the treadle-lever M and M' are converted into a rotative motion in the axles G and G' by means of the connecting rods or links O and O' and cranks P and P' in a manner obvious to every machinist.

Q and Q' are hand-levers which are formed with two arms, the upper ones, R and R', being for the hands of the operator to propel the machine with, and the lower ones, S and S', being connected with the cranks P and P' by means of the connecting rods or links. T and T' impart a rotative motion to the cranks P and P', and thus propel the vehicle. The link Z holds the cranks P and P' diametrically opposite to each other without rigidly holding them in the same axial line.

The construction of the fulcrum-bearing of the stirrups is peculiar. It consists of a bottom piece, U, shown in Fig 12, and a cap, V, shown in Fig. 13, which, when placed together, present an end view, as shown in Fig. 11. The upper ends of the stirrups or treadle-levers are cylindric, and have grooves W in them, as shown in Fig. 14, which grooves fit in a collar, X and X', in the bearing, as shown in Fig. 12. The combined effect of the collar X and groove W is to retain the stirrup-lever in the bearing, and at the same time to permit the lever to swing backward and forward with the motion of the feet of the operator. The cranked axles are held in their proper places by means of the bearing-boxes Y and Y'. (Shown in Figs. 15 and 16 in detail.) The fulcrum-bearing of the treadles is easily adjusted by unscrewing it from the perch D and screwing it on again either higher or lower, to adapt it to the size of the occupant of the vehicle.

The guiding-wheels are controlled and steered in the same manner as in the ordinary velocipedes in general use.

I am aware that velocipedes have been made and operated by the hands, and also that they have been made and operated by the feet, and therefore do not claim either as my invention; but What I do claim as my invention, and desire to secure as such by Letters Patent, is—

1. The combination of the two cranked axles G and G', with the connecting-link Z, with the bearing C, substantially for the purpose as described and shown.

2. The construction of the fulcrum-bearing N of the treadle-levers when used in combination with the brace D, substantially as described and shown.

3. The construction and arrangement of the frame as hereinbefore set forth and described.

WILLIAM QUINN.

Witnesses:
 JOHN WHITE,
 JOHN A. HURLEY.